(12) United States Patent
Takai et al.

(10) Patent No.: US 7,156,773 B2
(45) Date of Patent: Jan. 2, 2007

(54) ELECTRONIC APPARATUS, INPUT DEVICE, AND INPUT METHOD

(75) Inventors: Motoyuki Takai, Tokyo (JP); Yoichiro Sako, Tokyo (JP); Toshiro Terauchi, Tokyo (JP); Makoto Inoue, Tokyo (JP); Masamichi Asukai, Kanagawa (JP); Katsuya Shirai, Kanagawa (JP); Yasushi Miyajima, Kanagawa (JP); Kenichi Makino, Kanagawa (JP)

(73) Assignee: Sony Corporation (JP)

( * ) Notice: Subject to any disclaimer, the term of this patent is extended or adjusted under 35 U.S.C. 154(b) by 1 day.

(21) Appl. No.: 11/077,856

(22) Filed: Mar. 11, 2005

(65) Prior Publication Data
US 2005/0233859 A1 Oct. 20, 2005

(30) Foreign Application Priority Data
Apr. 5, 2004 (JP) ............................. P2004-111446

(51) Int. Cl.
*A63B 21/00* (2006.01)
*A63B 22/00* (2006.01)

(52) U.S. Cl. .................... 482/7; 482/1; 482/8; 482/900
(58) Field of Classification Search ................ 482/1–9, 482/900–902; 473/409; 702/127, 160
See application file for complete search history.

(56) References Cited

U.S. PATENT DOCUMENTS

| 4,771,394 | A | * | 9/1988 | Cavanagh | 702/160 |
| 5,372,365 | A | * | 12/1994 | McTeigue et al. | 473/409 |
| 5,524,637 | A | * | 6/1996 | Erickson | 600/592 |
| 5,714,706 | A | * | 2/1998 | Nakada et al. | 84/730 |

* cited by examiner

*Primary Examiner*—Glenn E. Richman
(74) *Attorney, Agent, or Firm*—Lerner, David, Littenberg, Krumholz & Mentlik, LLP

(57) ABSTRACT

A walking sensor is attached to a shoe of the user and cooperates with an input device including a detection section detecting a movement of a user's leg, a signal conversion section converting a detection result of the detection section into a control signal, and an output section outputting the control signal to an external device.

8 Claims, 9 Drawing Sheets

Table 1 Example of correspondence between patterns and commands

| Pattern | Command |
|---|---|
| Pattern 1 | Reproduction |
| Pattern 2 | Stop |
| Pattern 3 | Pause |
| Pattern 4 | Rewind |
| Pattern 5 | Record |
| Pattern 6 | Time stamp |

ELECTRONIC APPARATUS, INPUT DEVICE, AND INPUT METHOD

CROSS REFERENCES TO RELATED APPLICATIONS

The present invention contains subject matter related to Japanese Patent Application JP 2004-111446 filed in the Japanese Patent Office on Apr. 5, 2004, the entire contents of which being incorporated herein by reference.

BACKGROUND OF THE INVENTION

1. Field of the Invention

The present invention relates to an electronic apparatus that operates according to a predetermined control signal that has been input by a user, an input device for inputting the control signal, and an input method.

2. Description of Related Art

There exists an input device having a shape like a steering wheel or a gun, like a game-input device. Such a "virtual" input device contributes to increase the reality of the game. When a user inputs information by moving his or her body, he or she feels a strong identification with information. In the game-input device, its shape is fixed and the content to be input is limited. However, if user's body movement can be directly input as input information, various information can be input through the input device. As such input device, a list band type input device has been available. This input device includes a plurality of electrodes. A power supply source is attached around the user's list. A condenser is formed between the electrode and the surface of the body. The input device can detect a gesture such as "holding", "twisting", or "releasing" based on the change in the condenser capacity. In the system of this input device, a sensor is also attached to the sole of foot and detects walking movement or balance movement (see, for example, Jpn. Pat. Appln. Laid-Open Publication No. 2002-358149).

The invention disclosed in Japanese Patent Application Laid-Open Publication No. 2002-358149 detects the human's movements such as "holding", "twisting", or "releasing", as described above. However, the movement of the human body is not always constant but "fluctuation" may be generated in the detection signal. Thus, a very complicated operation is required to accurately analyze the data.

SUMMARY OF THE INVENTION

It is desirable to provide an input device that converts a simple movement of the user's leg portion into a complicated input, an input method, and an electronic apparatus.

According to an input device of the present invention, a detection means detects the movement of the user's leg portion, a signal conversion means converts the movement of the user's leg portion into a control signal, and an output means outputs the control signal to an external device. The control signal is a command for controlling the external device.

According to an electronic apparatus of the present invention, a detection means detects the movement of the user's leg portion, a signal conversion means converts the movement of the user's leg portion into a control signal, and a control means allows the electronic apparatus to execute the operation corresponding to the control signal.

According to an input method of the present invention, a detection step detects the movement of the user's leg portion, a signal conversion step converts the movement of the user's leg portion into a control signal and an output step outputs the control signal to an external device.

According to the present invention, by using a detection means for detecting the movement of the user's leg portion, it is possible to input a control signal with only the movement of the leg portion while ensuring flexibility of hands. Further, in the case where the hands can not be used, such as during conversation using a mobile phone, during the work in the factory, during load carriage, during operation using a keyboard or mouse, or during rush hour in a packed train, the input device according to the present invention makes full use of its feature because the control signal can be input using the movement of the leg portion.

When a user inputs information by moving his or her body, he or she can feel a strong identification with information. The movement of the leg portion such as walking or dancing can be reflected in the music or video contents by the input device.

DETAILED DESCRIPTION OF THE PREFERRED EMBODIMENTS

An input device according to the present invention will be described below with reference to the accompanying drawings. The input device includes a sensor that detects the movement of the human's foot. The sensor detects the movement of the foot based on the step of the foot or vertical movement of the body. The input device converts the movement of the human's foot that has been detected by the sensor into a command and outputs the command.

Figure 1:
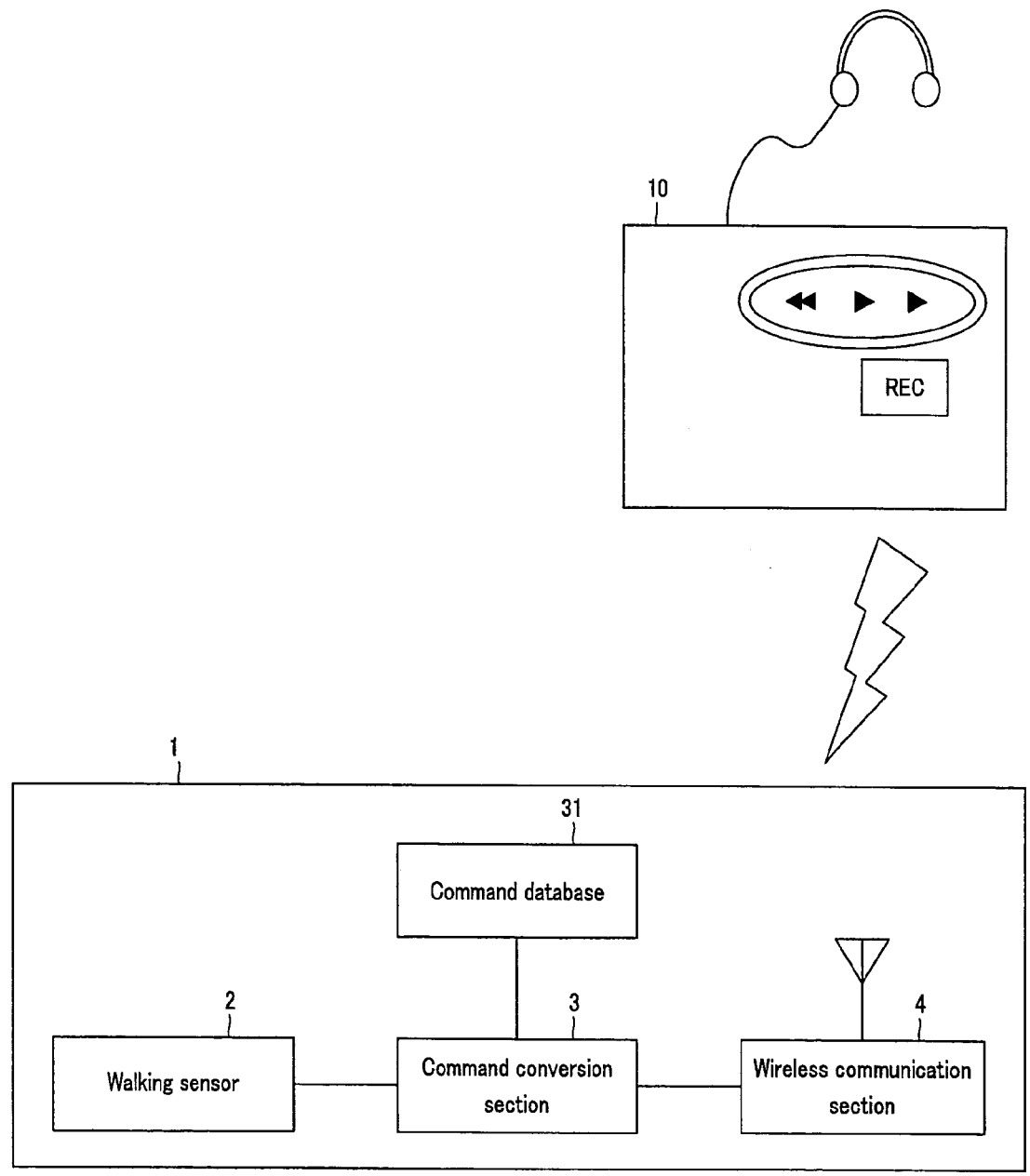
FIG. 1 is a block diagram showing the configuration of an input device according to the present invention.

FIG. 1 shows an example of the input device 1. The input device 1 includes a walking sensor 2 that detects the step of the user's foot, a command conversion section 3 that converts the output of the walking sensor 2 into a command, and a wireless communication section 4 that outputs the command to a contents reproduction apparatus 10.

Examples of the contents reproduction apparatus 10 include a portable MD (MiniDisc™) player, a portable DVD player, a potable TV, a PDA (Personal Digital Assistance) and the like. The input device 1 outputs various commands such as "RECORD", "REPRODUCTION", or "STOP" to the contents reproduction apparatus 10.

Figure 2:
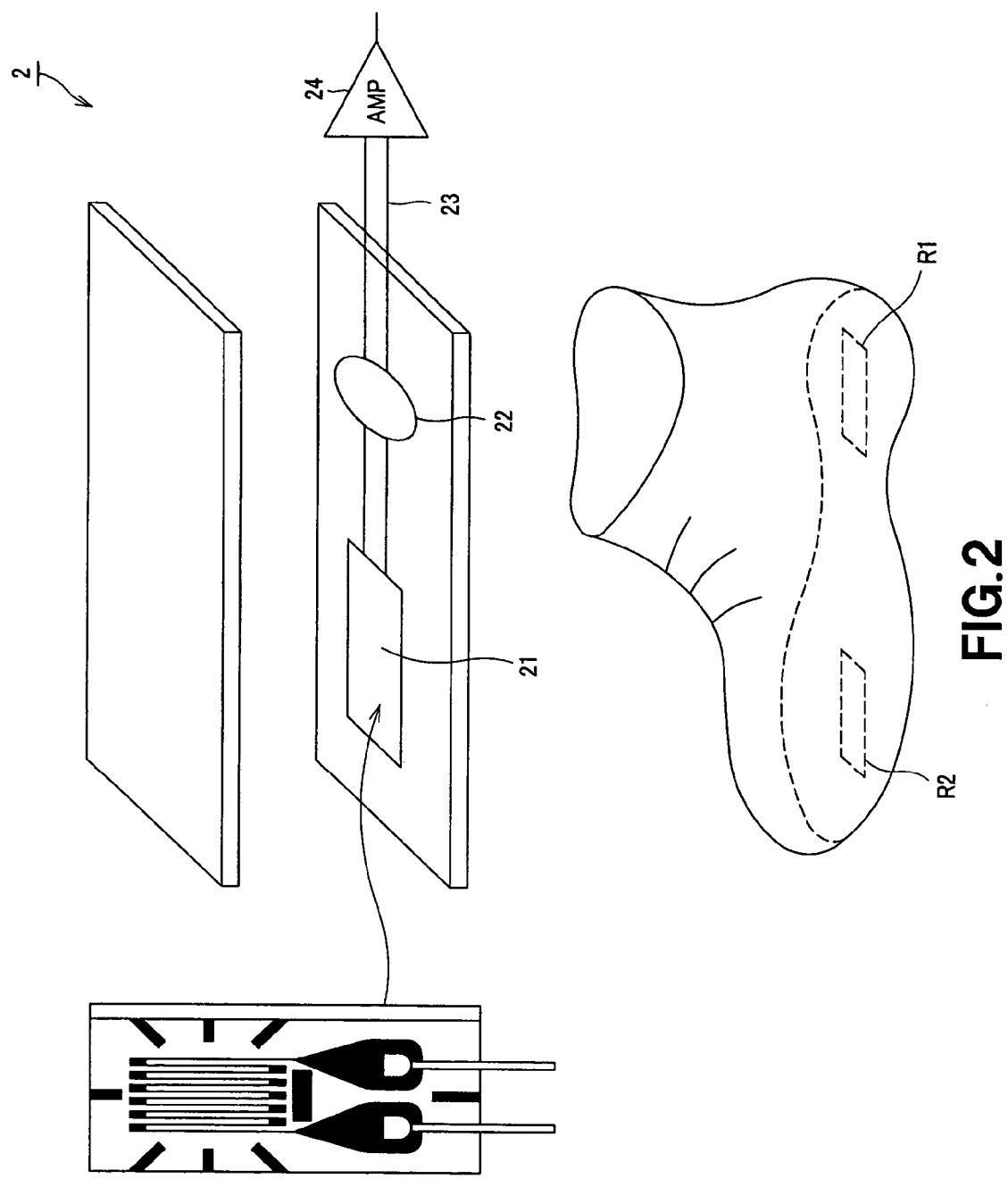
FIG. 2 shows the configuration and attachment position of a walking sensor using a commodity-type foil strain gauge.

The walking sensor 2 is attached to the shoe sole. The walking sensor 2 shown in FIG. 2 is a commodity-type foil strain gauge and bonded to a phosphor bronze plate 21. The commodity-type foil strain gauge converts a bending force into an electrical signal. Plus and minus of the electrical signal correspond to the bending directions. The walking sensor 2 is attached to the shoe sole so as to output the plus electrical signal when the foot is stepped down the ground and output the minus electrical signal when the foot is released from the ground. The walking sensor 2 is attached to the portion corresponding to the base of the big toe (hereinafter, referred to as front portion) and further attached to the portion corresponding to the vicinity of a heel (hereinafter, referred to as rear portion) for each foot. A walking sensor attached to the rear portion of the right foot is referred to as R1, one attached to the front portion of the right foot is referred to as R2, one attached to the rear portion of the left foot is L1, and one attached to the front portion of the left foot is L2.

Figure 3:
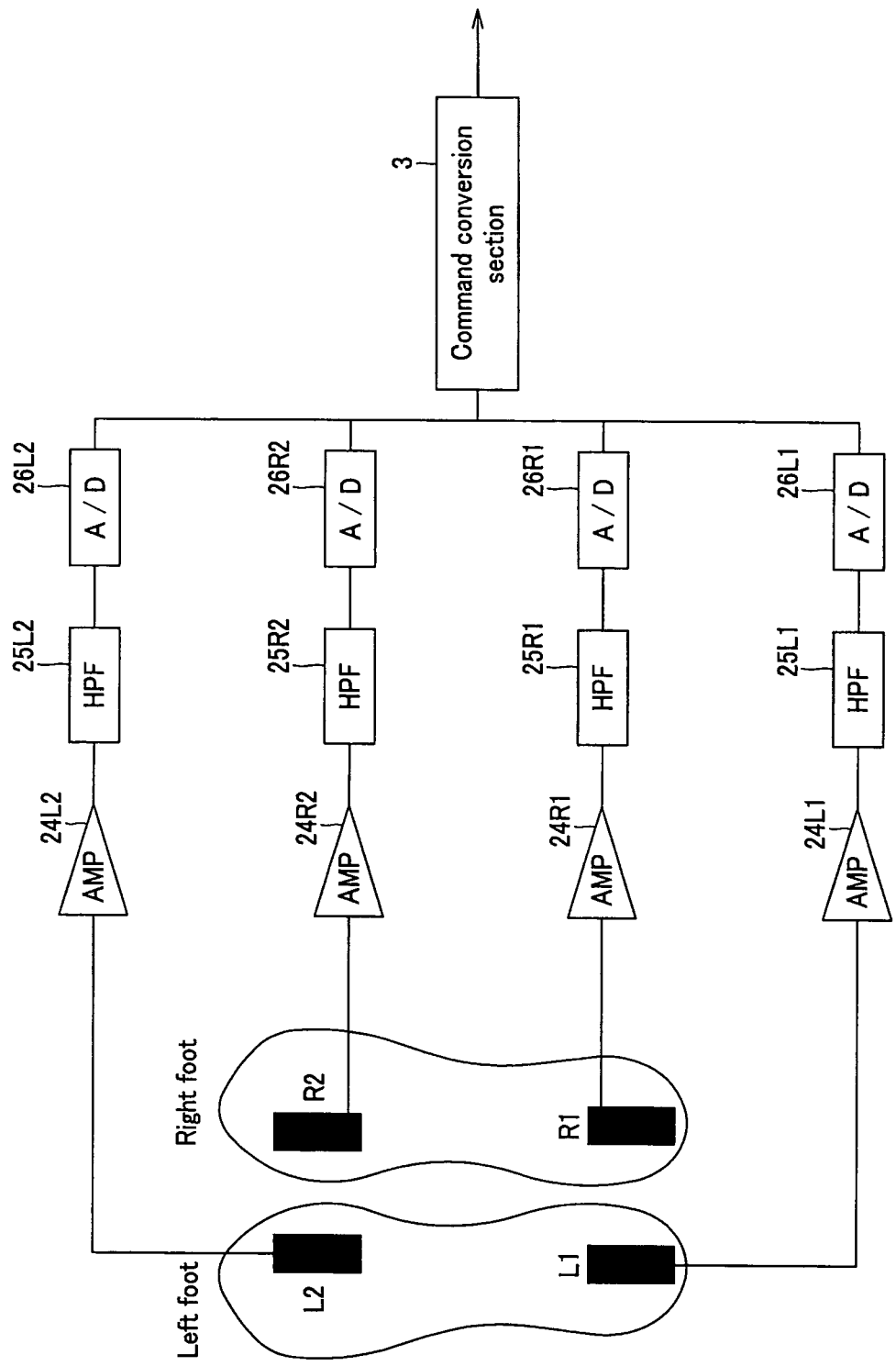
FIG. 3 is a block diagram showing the configuration of the input device when the commodity-type foil strain gauge is used as the walking sensor.

An output terminal 23 of the walking sensor 2 is reinforced with a reinforcing material 22 and extends outside of the phosphor bronze plate 21. The detection result (hereinafter, referred to as walking signal) of the walking sensor L1 is output to an amplifier 24L1, as shown in FIG. 3. The amplifier 24L1 amplifies the output of the walking sensor L1 and outputs the amplified value to a high-pass filter (HPF) 25L1. The HPF 25L1 removes DC component of the output from the amplifier 24L1. The output of the HPF 25L1 is digitized by an A/D conversion circuit 26L1. Similarly to the walking sensor L1, the outputs of other walking sensors L2, R1, and R2 are passed through the amplifiers 24L2, 24R1, and 24R2, HPFs 25L2, 25R1, and 25R2, and digitized by A/D conversion circuits 26L2, 26R1, and 26R2.

Figures 4A, 4B:
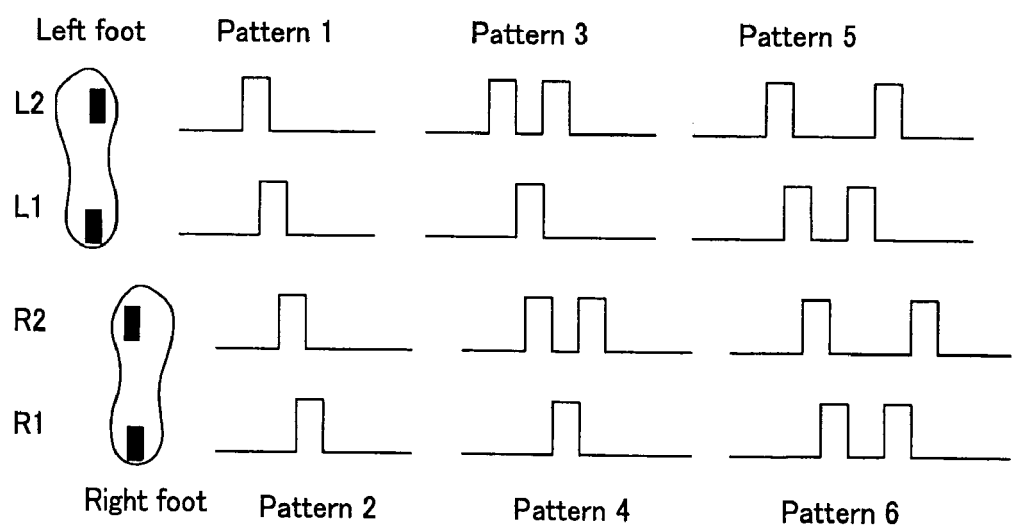
FIGS. 4A and 4B show an example of walking signals corresponding to command database and commands.

The command conversion section 3 converts the walking signal into a command with reference to a command database 31. The wireless communication section 4 outputs a command to the contents reproduction apparatus 10. The command conversion section 3 converts the detection result of the walking sensor 2 into a command as follows. When receiving a walking signal as an input, the command conversion section 3 searches a command corresponding to the input walking signal from the command database 31. FIG. 4A is an example of the command database 31. This command database 31 stores six walking signal patterns and commands corresponding to the walking signal patterns. FIG. 4B shows the walking signal patterns. Pattern 1 is L2-L1 (stepping down the left foot in the order of toe and heel). Pattern 2 is R2-R1 (stepping down the right foot in the order of toe and heel). Pattern 3 is L2-L1-L2 (stepping down the left foot in the order of toe, heel and toe). Pattern 4 is R2-R1-R2 (stepping down the right foot in the order of toe, heel and toe). Pattern 5 is L2-L1-L1-L2 (stepping down the left foot in the order of toe, heel, heel, and toe). Pattern 6 is R2-R1-R1-R2 (stepping down the right foot in the order of toe, heel, heel, and toe).

The pattern 1 corresponds to "REPRODUCTION" command, the pattern 2 corresponds to "STOP" command, the pattern 3 corresponds to "PAUSE" command, the pattern 4 corresponds to "REWIND" command, the pattern 5 corresponds to "RECORD" command, and the pattern 6 corresponds to "TIME STAMP" command.

The command conversion section 3 determines whether the user walks normally or not. When it has been determined that the user does not walk normally, the command conversion section 3 performs matching between the walking signal pattern detected by the walking sensor 2 and the walking pattern stored in the command database 31. When the pattern that matches the command database 31 exists, the command conversion section 3 outputs a command corresponding to the pattern to the contents reproduction apparatus 10.

A description will be given of the patterns to be registered in the command database 31. The patterns generated by an ordinary bodily movement such as walking or stopping are not registered in the command database 31 in order to prevent the user from accidentally inputting an unintended command. If the patterns generated by an ordinary bodily movement are used, interval or intensity of the patterns may be set to an appropriate value.

Figure 5:
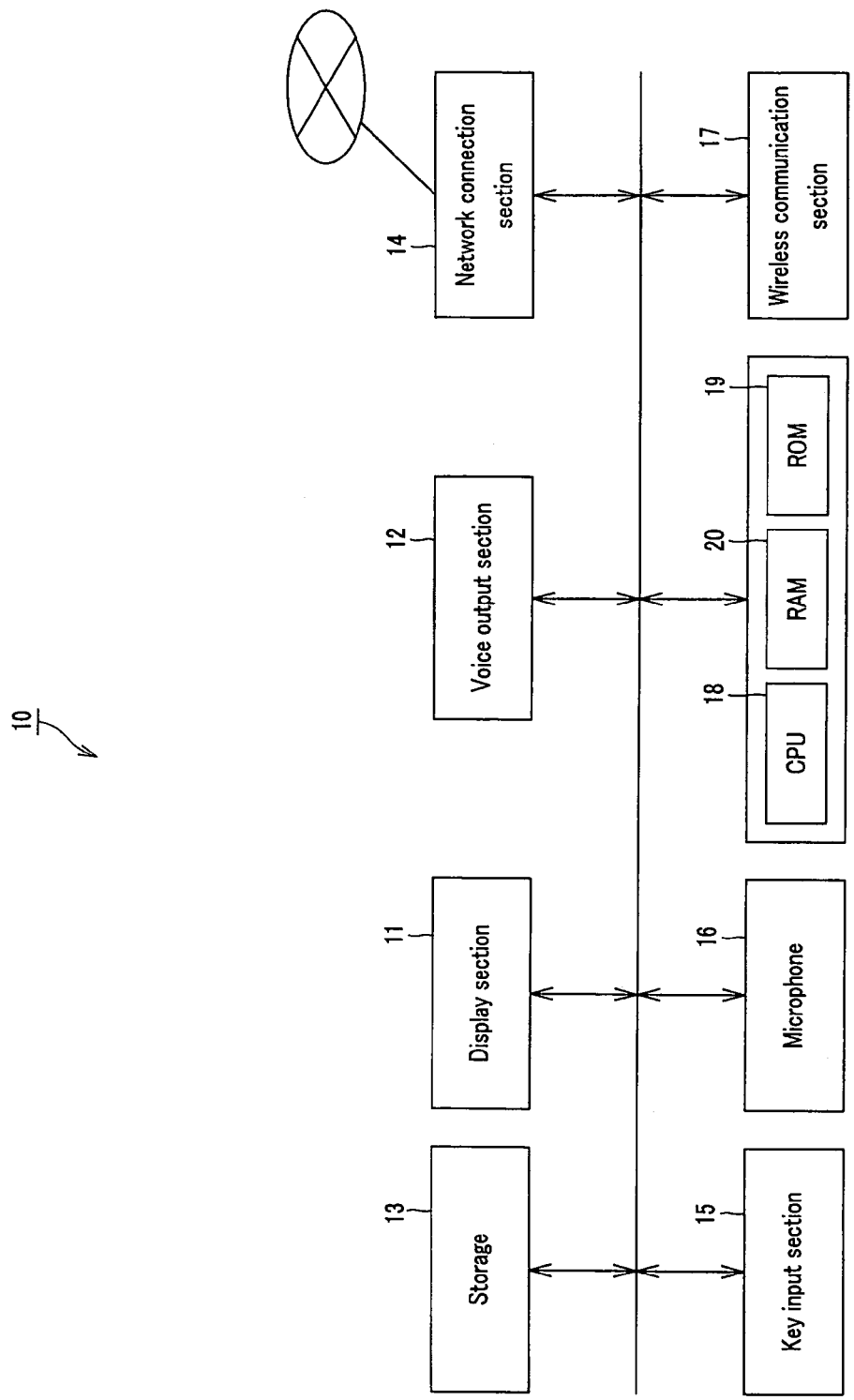
FIG. 5 is a block diagram showing the configuration of a contents reproduction apparatus.

FIG. 5 shows the configuration of the contents reproduction apparatus 10. The contents reproduction apparatus 10 is an apparatus that reproduces voice or video picture. The contents reproduction apparatus 10 includes a voice output section 12 for outputting voice contents and a display section 11 for outputting image contents. The voice or image contents are stored in a storage 13. The storage 13 includes an HD (Hard Disc), an optical disc, a semiconductor memory and the like. The contents to be stored in the storage 13 can be downloaded from the Internet through a network connection section 14.

The contents reproduction apparatus 10 further includes a key input section 15 and a microphone 16. The key input section 15 receives the input of commands such as "REPRODUCTION", "STOP", "PAUSE" or "SELECT" and outputs the input command to a CPU 18.

A wireless communication section 17 performs wireless communication with the input device 1. The information that the wireless communication section 17 receives from the input device 1 includes commands for controlling the contents reproduction apparatus 10, such as "REPRODUCTION", "RECORD", "PAUSE" or "FAST-FORWARD".

The CPU (Central Processing Unit) 18 controls the contents reproduction apparatus 10 based on the input command. A ROM (Read Only Memory) 19 and storage 13 store programs and setting information needed to control the contents reproduction apparatus 10. The CPU 18 performs various processes such as record, reproduction, or pause of the contents using a RAM (Random Access Memory) 20 as a work area.

As described above, the input device 1 according to the present invention converts the movement of the user's foot into various commands and outputs them to the contents reproduction apparatus 10.

Figure 6:
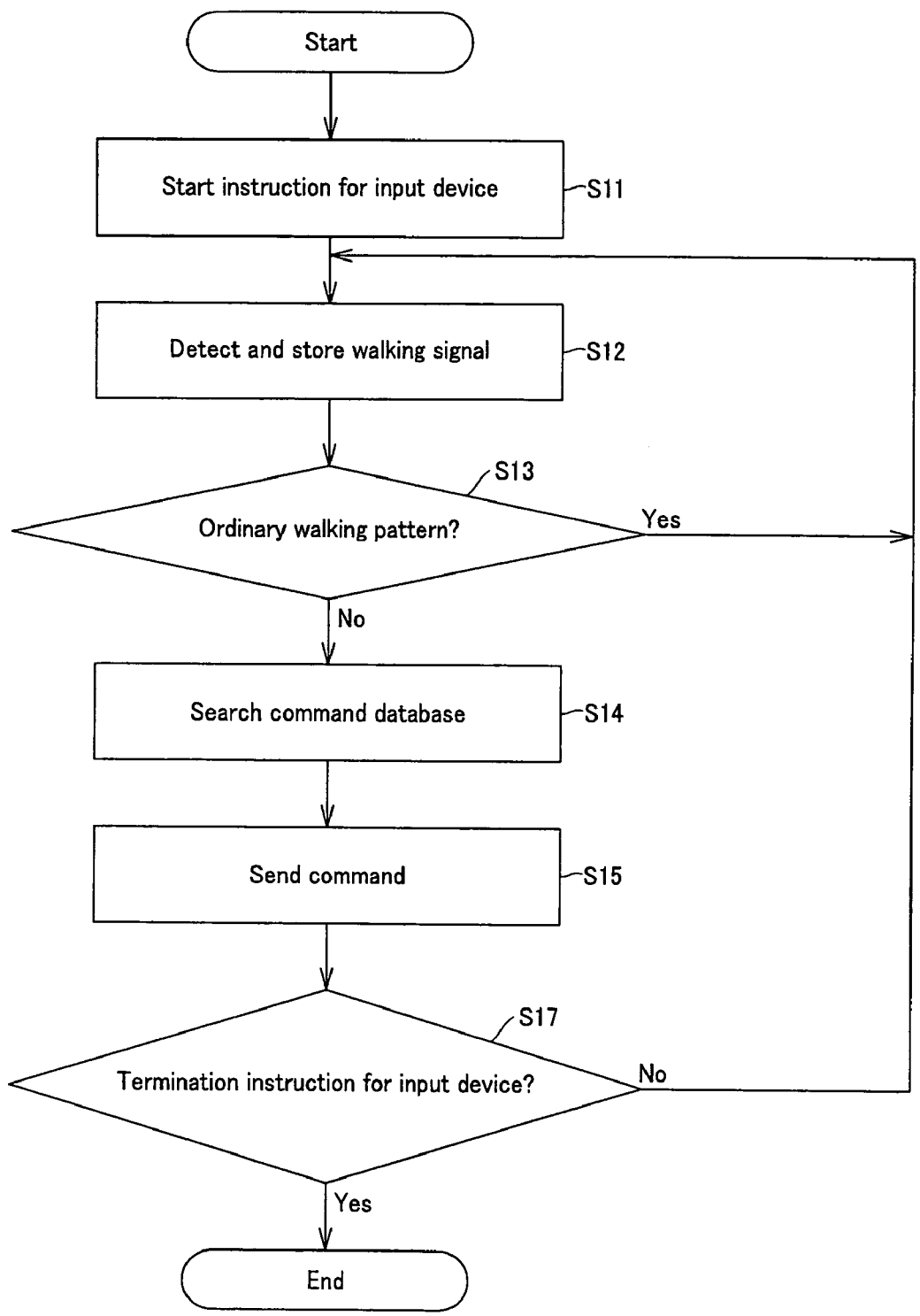
FIG. 6 is a flowchart for explaining the operation of the input device and contents reproduction apparatus.

FIG. 6 shows the operation of the input device 1. Although not shown, the input device 1 includes a CPU and memory for performing signal processing in the input device 1. The input device 1 starts its operation according to the user's instruction. When the user instructs the input device 1 to start its operation (step S11), the walking sensor 2 detects the walking signal. The detected walking signal is stored in the memory for a certain period (step S12). When the walking signal that has now been stored in the memory is similar to an ordinary walking pattern shown in FIG. 7, the CPU determines that the user is walking normally. More specifically, human's walking movement is characterized in that the following movements are repeated: the heel of the stepped foot firstly contacts the ground, next, the toe of the stepped foot contacts the ground, and then another foot is stepped forward. The walking sensor 2 detects the contacts of the heel and toe to the ground to determine the user is now walking. The output of the walking sensor 2 at the ordinary walking time is as shown in FIG. 7 (YES in step S13).

Figure 7:
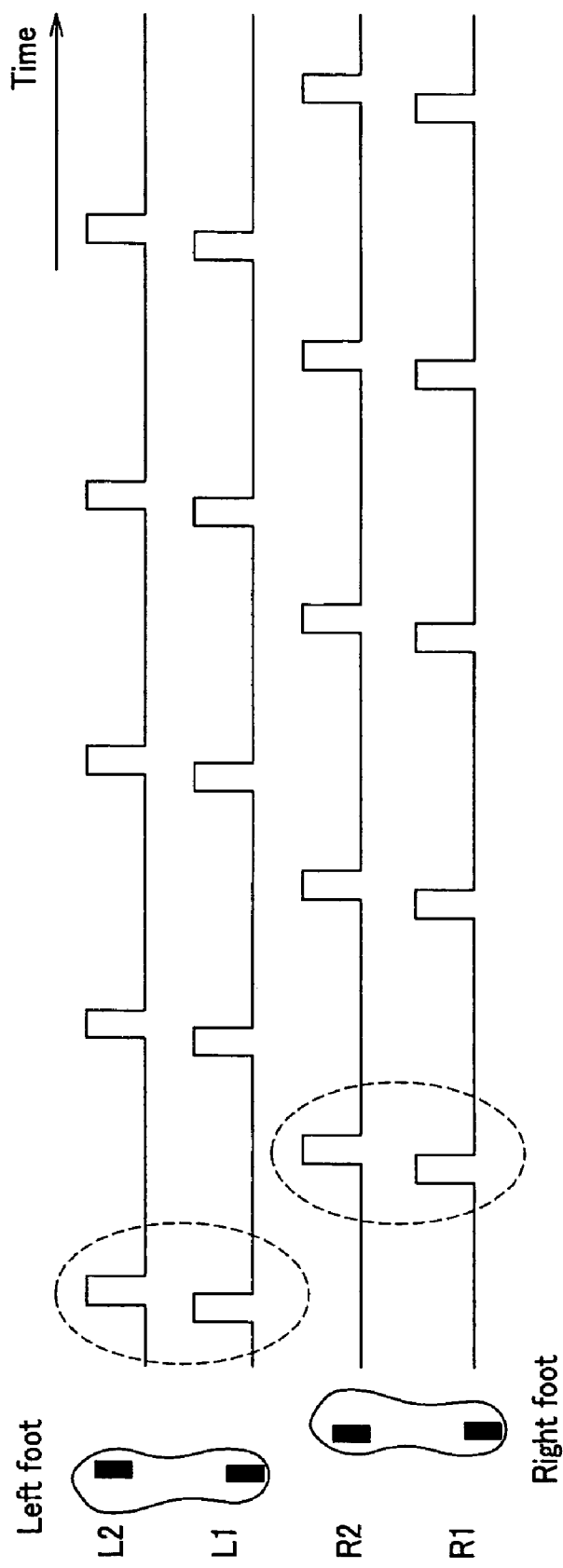
FIG. 7 is a view showing the output of the walking sensor at the walking time.

When a pattern different from the walking signal shown in FIG. 7 has been detected (No in step S13), the command conversion section 3 compares the walking signal pattern stored in the memory and the walking signal pattern stored in the command database and searches the command corresponding to the walking signal (step S14).

When the walking signal pattern stored in the memory exists in the command database 31, the command conversion section 3 outputs a command corresponding to the walking signal pattern to the wireless communication section 17. The wireless communication section 17 outputs the input command to the contents reproduction apparatus 10 (step S15). The contents reproduction apparatus 10 performs various processes such as reproduction, stop, fast-forward, or rewind of the contents in response to the command received from the input device 1. The voice output section 20 utters an electronic sound for representing the reception of the user's command.

When the user stops the operation of the input device 1 (YES in step S16), the input device 1 ends its process. On the other hand, when the user does not end the operation of the input device 1 (No in step S16), the flow shifts to step S12, where steps S12 to S16 are repeated.

As described above, it is possible to operate the input device 1 according to the present invention by means of foot. The operation using the foot eliminates the need to take an apparatus main body or a remote controller from the bag or the like and operate the key input section 15.

Further, in the case where the hands can not be used, such as during conversation using a mobile phone, during the work in the factory, during load carriage, during operation using a keyboard or mouse, or during rush hour in a packed train, the input device according to the present invention makes full use of its feature because the input device can be operated using the movement of the foot.

The input device 1 shown in FIGS. 1 and 3, includes a memory, command conversion section 3, and command database 31. Alternatively, however, the above components can be included in the contents reproduction apparatus 10. That is, in the configuration example mentioned here, the input device 1 includes the walking sensor 2, amplifier and HPF that formats the walking signal from the walking sensor 2, and wireless communication section 4 that sends the resultant walking signal to the contents reproduction apparatus 10.

In this case, the configuration of the contents reproduction apparatus 10 can be described with reference to FIG. 5. That is, in the above-mentioned configuration, the memory is constituted by using a part of the RAM 20, the command database 31 is stored in a part of the ROM 19, RAM 20 or storage 13, and the CPU 18 executes the process of the command conversion section 3. The walking signal sent from the wireless communication section 4 of the input device 1 is received by the wireless communication section 17 of the contents reproduction apparatus 10. The received walking signal is then stored in the RAM 20 for a certain period. The CPU 18 compares the walking signal pattern that has been stored in the RAM 20 with the walking signal pattern that has been stored in, for example, the storage 13, converts the walking signal into the corresponding commands as a command conversion section and performs various processes such as reproduction, stop, fast-forward, or rewind of the contents.

The entire operation is the same as that of the abovementioned configuration and detailed description will be omitted. In this configuration, however, the walking signal to be sent from the input device 1 may be the multiplication of the output signals of the walking sensors L1, L2, R1, and R2 that have been formatted in the amplifiers and HPFs. For example, the output signals of the walking sensors L1 and L2, R1 and R2 may be mixed with each other and then transmitted. Further, the output signal may be transmitted as an analog signal without conversion or converted into digital signal as in the case of FIG. 3.

Figure 8:
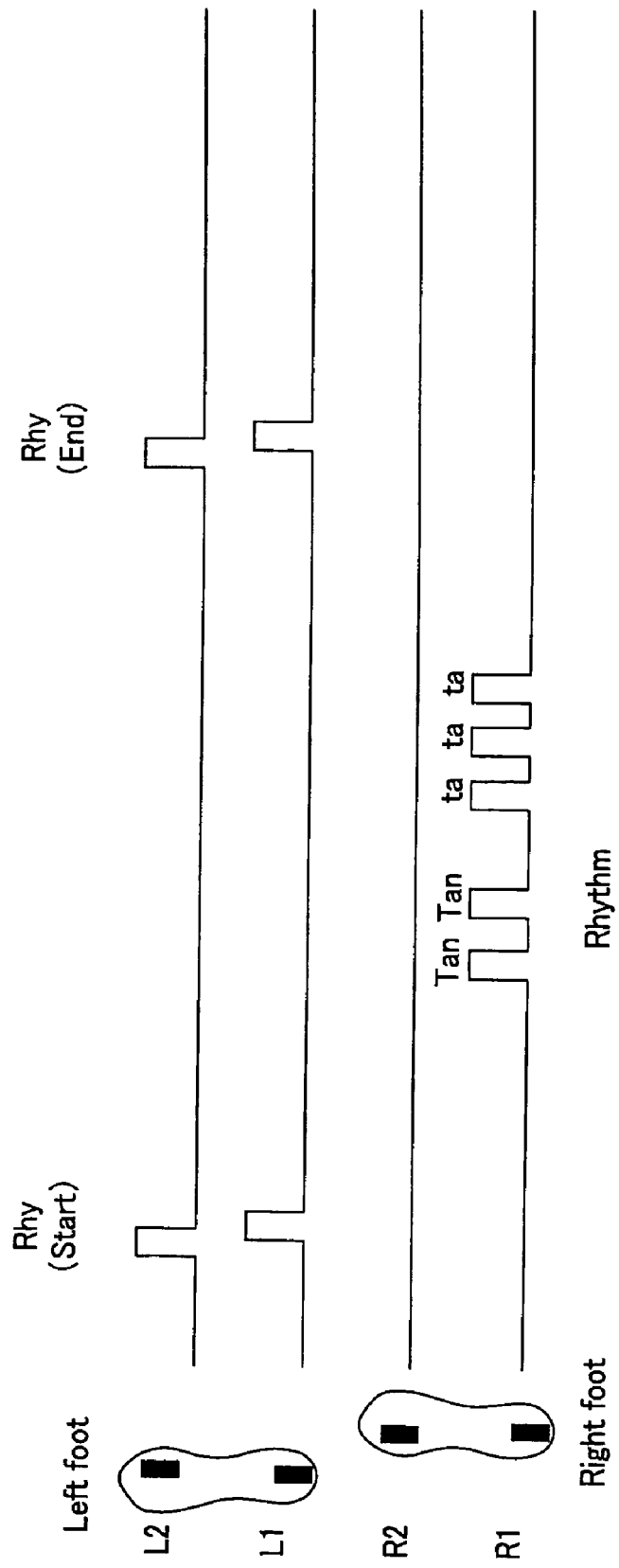
FIG. 8 is a view showing the output of the walking sensor at the rhythm input time.

Another usage of the above input device 1 will be described. The input device 1 taken here has a function of inputting a rhythm pattern. The input device 1 converts the user's steps into rhythm of music. FIG. 8 is an input example of a rhythm pattern. When a command for starting rhythm input is input, the input device 1 recognizes the walking signal not as a command, but as a rhythm pattern.

In the following example, the walking signal obtained by stepping the toe of the right foot and heel of the left foot is set as command Rhy that instructs the start and end of the rhythm input operation. When the command Rhy is input, the input device 1 recognizes the walking signal that has been input until the next command Rhy is input as a rhythm pattern. In this example, the walking signal is input as a rhythm pattern saying "tan-tan-tatata".

When it becomes possible to input a rhythm pattern using footsteps, like the input device 1, the user can newly create music or change tempo or pitch of the existing music based on the user's footsteps. Further, a command that changes tone or atmosphere of music may be set.

In addition to the above-described commodity-type foil strain gauge, a ranging sensor, a CCD (Charge Coupled Device) camera, a CMOS (Complementary MOS) camera, a pressure sensor, a bending sensor, an acceleration sensor, and a capacitance sensor can be used as the walking sensor 2.

Figure 9A:
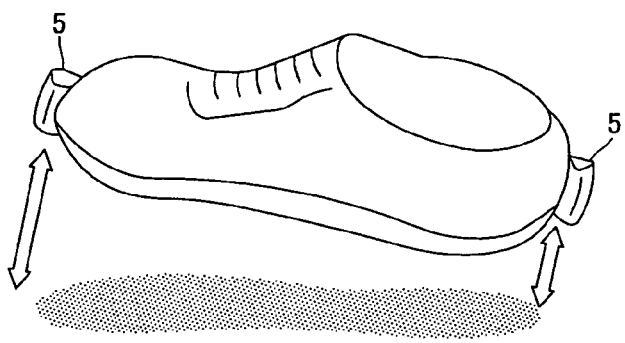
FIGS. 9A to 9D show other variations of the walking sensor.
Figure 9B:
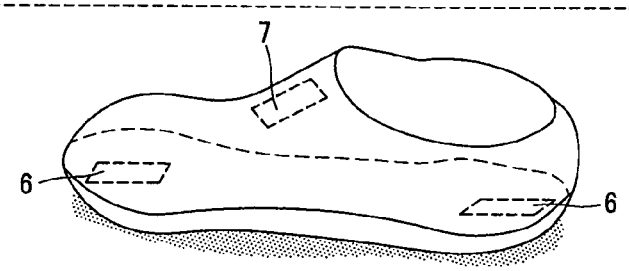

A walking sensor 5 shown in FIG. 9A detects the footstep based on the distance between the shoe and ground. The walking sensor 5 is attached to the toe and heel of the shoe. An infrared ray ranging sensor, a CCD camera, and a CMOS camera can be used as the walking sensor 5. A walking sensor 6 shown in FIG. 9B detects the step of the foot based on the pressure applied to the shoe from the foot. A pressure sensor 6 attached to the toe and heel of the shoe detects the pressure generated when the foot contacts the ground. Further, in this case, a bending sensor 7 is attached to the instep of the shoe. The larger the bending amount of the instep, the larger the output of the bending sensor 7. The bending sensor 7 can be used in a linear control system, such as volume control of sound or zoom control of the video camera.

Figure 9C:
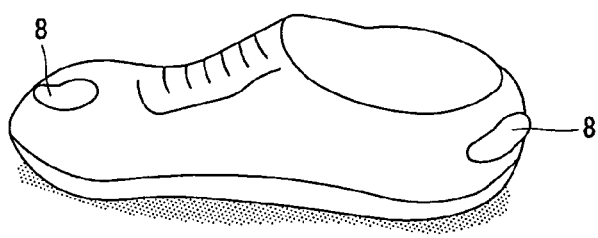
Figure 9D:
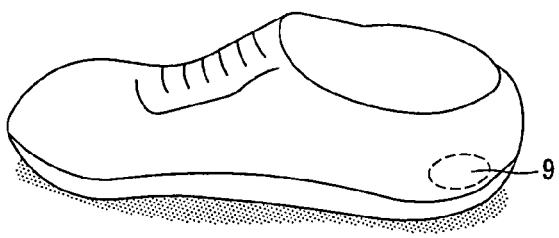

A walking sensor 8 shown in FIG. 9C is an acceleration sensor 8. The acceleration sensor 8 is attached to the toe and heel of the shoe and detects the impact generated when the foot contacts the ground. In addition to the above-nentioned walking sensor, there available a voice microphone type sensor that detects the contact between the foot and ground based on the contacting noise, and a capacitance sensor that detects the contact between the foot and ground based on the change of the capacitance in the body.

Further, when a vibration sensor or acceleration sensor is attached to a part of the user's body, the movement of the legs can be detected. When the user moves the leg portion, the user's body is displaced vertically. The vibration sensor or acceleration sensor that detects the vertical movement of the user's body can be used as the walking sensor. The detection accuracy of such walking sensor is increased when the sensor is attached to the trunk, head, lumber part and the like of the human body. Thus, the walking sensor of this type should be attached to a headphone to be attached to the head of the user.

Further, the walking sensor 2 may be attached to the leg portion such as instep, toe, ankle, calf, knee, or thigh. The walking sensor of this type includes, for example, an acceleration sensor, a skew sensor, a position sensor, an optical sensor, an electromagnetic induction sensor, an electrical potential sensor, a wind speed sensor, an air pressure sensor, and a current sensor. These sensors may be attached to an animal that accompanies the user.

The input device 1 described above can be applied to the command input in various electronic apparatuses. For example, when the input device 1 is used to control the video camera, "RECORD", "STOP", "ZOOM", "WIDE", and the like are set as the input command. When the input device 1 is used as an input device dedicated for the video camera, it is possible to prevent camera shake. Further, even when the hands cannot be used at the shooting time, the operation can be continued using parts other than hands.

Further, the input device 1 can be used as an input means for so-called a wearable computer. The wearable computer is a small portable computer that is designed to be worn on the body of the user during use. Like a regular personal computer, the wearable computer has mail exchange function, TV display function, video display function, Internet browsing function and the like. When a small video camera is attached to the glasses or the like, it is possible to shooting all the time the landscape or situation around the user with the wearable computer. The shot content of the video camera can be a user's experience record.

It is estimated that the enormous amount of data needs to be collected for the user's experience record based on the wearable computer. When commands of the input device 1 are related to ON/OFF of the video camera or time stamp, simply by moving the leg portion, the user can select and record only necessary information from the enormous amount of data collected for the user's experience record.

It should be understood by those skilled in the art that various modifications, combinations sub-combinations and alterations may occur depending on design requirements and other factors insofar as they are within the scope of the appended claims or the equivalents thereof.

What is claimed is:

1. An input device for enabling a user to provide a command to a device external to the user, said input device comprising:
   a number of sensors operable to detect movement of the user;
   detection means for detecting a movement pattern of the user based on the detected movement obtained from the number of sensors;
   a database operable to store therein a plurality of predetermined movement patterns and a control signal corresponding to each of the predetermined movement patterns;
   signal conversion means for comparing a detected movement pattern obtained from the detection means with the predetermined movement patterns stored in the database and, when a match is obtained, for obtaining a respective control signal corresponding thereto; and
   output means for outputting the respective control signal as a desired command to an external device.

2. The input device according to claim 1, wherein the control signal is a command for controlling the external device.

3. The input device according to claim 1, wherein the detection means is attached to at least one portion of shoes, instep, toe, ankle, calf, knee, or thigh of the user.

4. The input device according to claim 1, wherein the detection means is attached to at least one portion of body trunk, lumbar part, or head of the user.

5. The input device according to claim 1, wherein the detection means is one of a bending sensor, a pressure sensor, a ranging sensor, and acceleration sensor, a skew sensor, a magnetic sensor, a current sensor, an electrical potential sensor, or an electromagnetic induction sensor.

6. The input device according to claim 1, further comprising rhythm generation means for generating a rhythm pattern from the detection result of the detection means.

7. An input method for enabling a user to provide a command to a device external to the user, said method comprising the steps of:
   providing a number of sensors operable to detect movement of the user;
   detecting a movement pattern of the user based on the detected movement obtained from the number of sensors;
   storing in a database a plurality of predetermined movement patterns and a control signal corresponding to each of the predetermined movement patterns;
   comparing a detected movement pattern obtained from the detecting step with the predetermined movement patterns stored in the database and, when a match is obtained, obtaining a respective control signal corresponding thereto; and
   outputting the respective control signal as a desired command to an external device.

8. An input device for enabling a user to provide a command to a device external to the user, said input device comprising:
   a number of sensors operable to detect movement of the user;
   a detection section operable to detect a movement pattern of the user based on the detected movement obtained from the number of sensors;
   a database operable to store therein a plurality of predetermined movement patterns and a control signal corresponding to each of the predetermined movement patterns;
   a signal conversion section operable to compare a detected movement pattern obtained from the detection section with the predetermined movement patterns stored in the database and, when a match is obtained, to obtain a respective control signal corresponding thereto; and
   an output section operable to output the respective control signal as a desired command to an external device.

* * * * *